United States Patent [19]

Whittaker

[11] Patent Number: 5,790,813
[45] Date of Patent: Aug. 4, 1998

[54] PRE-ARBITRATION SYSTEM ALLOWING LOOK-AROUND AND BYPASS FOR SIGNIFICANT OPERATIONS

[75] Inventor: Bruce Ernest Whittaker, Mission Viejo, Calif.

[73] Assignee: Unisys Corporation, Blue Bell, Pa.

[21] Appl. No.: 583,366

[22] Filed: Jan. 5, 1996

[51] Int. Cl.$^6$ .................................................. G06F 13/16
[52] U.S. Cl. ........................................ 395/293; 395/440
[58] Field of Search .................................... 395/293, 440

[56] References Cited

U.S. PATENT DOCUMENTS

| | | | |
|---|---|---|---|
| 4,933,901 | 6/1990 | Tai et al. | 365/189.07 |
| 4,956,820 | 9/1990 | Hashimoto | 365/222 |
| 5,287,469 | 2/1994 | Tsuboi | 395/425 |
| 5,379,379 | 1/1995 | Becker et al. | 395/250 |
| 5,440,698 | 8/1995 | Sindhu et al. | 395/200.08 |
| 5,469,560 | 11/1995 | Beglin | 395/439 |
| 5,488,712 | 1/1996 | Kiuchi | 395/431 |
| 5,553,268 | 9/1996 | Willenz et al. | 395/485 |
| 5,559,988 | 9/1996 | Durante et al. | 395/479 |
| 5,566,317 | 10/1996 | Treiber et al. | 395/444 |
| 5,590,379 | 12/1996 | Hassler et al. | 395/851 |

*Primary Examiner*—Ayaz R. Sheikh
*Attorney, Agent, or Firm*—Alfred W. Kozak; Mark T. Starr; Steven R. Petersen

[57] ABSTRACT

A system and method for setting the sequence of processor operations in real time depending on the nature of Write commands and Send Message Commands in waiting queues which are ordinarily sequenced with Read OPs according to the sequential order that the commands are received. The system will give bus access to Read commands ahead of the Write commands and other commands in the waiting queues as long as data coherency will not be affected. Thus, the sequence of bus access can be modified to a different sequence giving priority-of-access to Read commands.

4 Claims, 7 Drawing Sheets

PRE-ARBITRATION SYSTEM ALLOWING LOOK-AROUND AND BYPASS FOR SIGNIFICANT OPERATIONS

BACKGROUND OF THE INVENTION

Figure 3A:
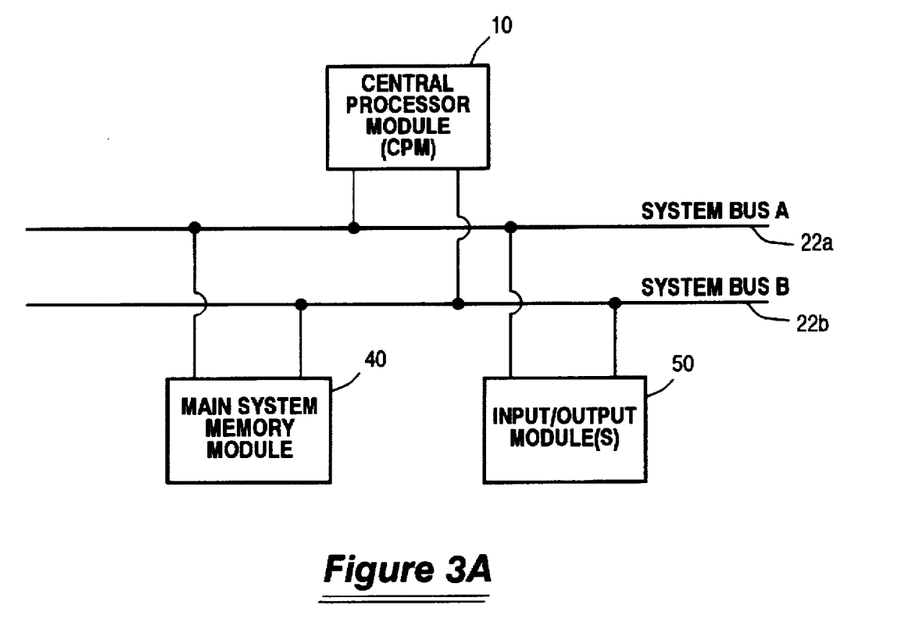
FIG. 3A is a network diagram of a computer system having digital modules, each of which may be initiators or responders, all connected to a dual system bus means.

A simplified drawing of a computer system is shown in FIG. 3A which includes a Central Processing Module 10, and Input/Output Module 50 and a Main System Memory Module 40. These modules are inter connected and share two identical system busses designated 22a and 22b. Additionally, this basic system can actually include two processor modules such as 10 and also two input/output modules such as 50 and the Memory Nodule 40, any of which can be all sending and receiving information flow on the two system busses.

The two system busses are identical and of equal priority. Any module seeking access to a bus, may eventually utilize, with equal probability, either one of the busses. Further, the modules involved may be sending modules and/or receiving modules utilizing both busses simultaneously.

With up to four possible bus initiators, that is to say, two processors and two I/O modules, and with up to five possible responders (two processors, two I/O modules, and the main memory module), the potential bus activity and ongoing traffic is of a rather extensive nature. Properly designed bus protocols and rigid adherence to these protocols by all of the modules is imperative for optimal system operations.

Figure 3B:
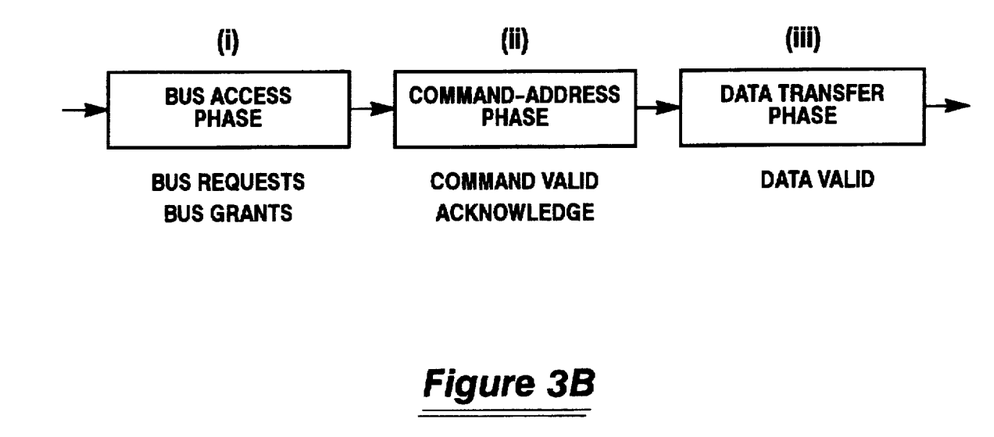
FIG. 3B is a diagram showing the basic phases of the system bus protocol involved.

FIG. 3B is a drawing which shows that the system bus protocol has three general phases, namely (i) a Bus Access Phase, (ii) a Command-Address Phase, and (iii) a Data Transfer Phase.

In the Bus Access Phase, a bus initiator, for example, a processor, requests control of one of the system busses 22a or 22b. A system bus arbiter circuit will grant to the initiator one of the two busses when a bus becomes available. At this point in time, the initiator "owns" the bus until it relinquishes control of the bus. This area is of significance to system operations as will be indicated in the described configuration.

In the command-address phase, (ii) the bus "owner" issues a bus operation (for example, a command) and an address value onto the system bus. During this phase, a number of important bus control signals are exercised by both the bus initiator and the bus responder, that is to say, the bus module for whom the bus command is directed or targeted. These signals provide and specify that a command is active (valid) on the system bus, and that the "bus responder" has acknowledged receipt of the command initiated. Other abnormal protocol situations may occur in this phase as well, but involve situations which are not pertinent to the presently described system.

In the data transfer phase, (iii) data from the initiator (assuming a write type of operation) or data from the responder (if a read type operation) is transferred on the system busses 22a, 22b. Again, bus signals are used to specify that valid data is active on the bus. When certain abnormal protocol situations occur in this phase, these are not considered pertinent in the scope of the presently described type of system operation.

Figure 6:
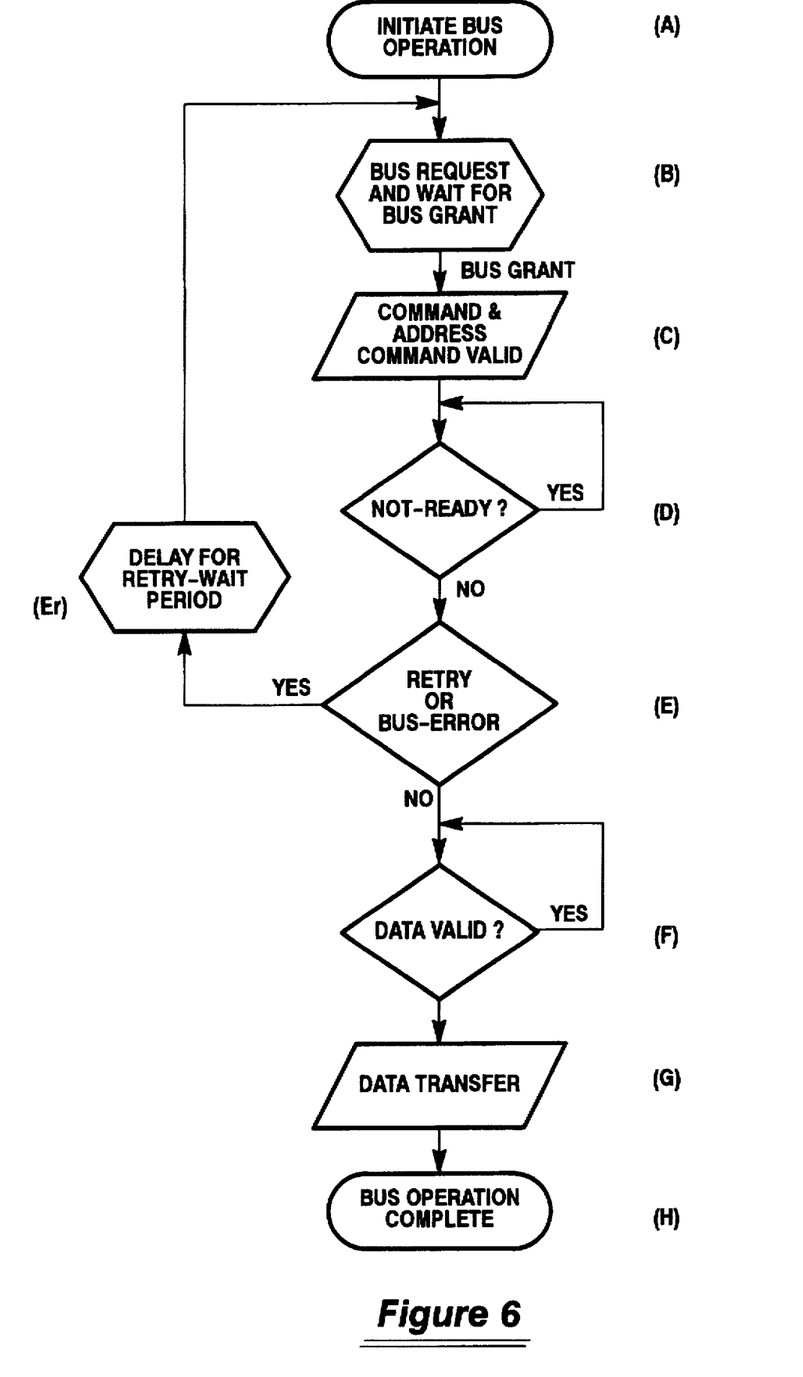
FIG. 6 is a flow chart illustrating the system bus protocol involved in the utilization of the system busses.

FIG. 6 is drawn to indicate a simplified view of the system bus protocol in flow chart form. Thus, at (A) an initiating module will initiate a command onto the dual bus system which is sent to (B) which involves a bus request and a waiting period for the bus grant signal. When the bus grant signal is forthcoming, then (C) shows the verification of the command and the address of the command as being valid. At (D) a decision must be instituted as to whether the responder (targeted module) is ready or not. If the responder or targeted module is not ready, then at (E), there is required a retry or a bus error signal which is sent to the loop (Er) which involves a delay for the retry-wait period which then returns back to the bus request operation and waits for bus grant at (B).

At the step (E), if there is no retry or bus-error involved, then the protocol proceeds to step (F) to check whether the data is valid, which data was sent from, for example, the processor at step (A). If the data is valid, then at step (G), the data is transferred to the targeted or responder module and the bus operation is complete at (H). The important area which is disclosed and handled in the present system is seen at step (B) which shows a darkened area involving the bus request and the wait period for the bus grant.

System Bus Access

Access rights to either one of the system busses 22a, 22b is strictly controlled by a system bus arbitration module where there is generally one such unit per system. Such a system bus arbitration logic unit may be seen in FIG. 2 as module 38. Each one of the bus modules, such as processor 10 or I/O processors 50, has a specific Bus-Request signal to the bus arbiter module 38. A system requestor does not make a request for a specific system bus such as 22a or 22b, but only requests accessed for any bus that may become available. The bus arbiter 38 monitors whether the system bus is currently "owned" by another requestor and is "busy". When a bus becomes available, the bus arbiter will grant access to the next requestor in sequence. Multiple requests are resolved on a round-robin basis criteria. Each of the requesting bus modules receives a unique Bus-Grant signal for each one of the two system busses. Then once a requestor module receives its bus-grant for a system bus, it then "owns" that bus and can execute the operation that is required. When the requestor module is finished with its bus operation, it will deactivate its Bus-Busy signal for the specific bus that it had owned. At this time, the bus arbiter 38 may then assign that bus to another requestor module.

Figure 1:
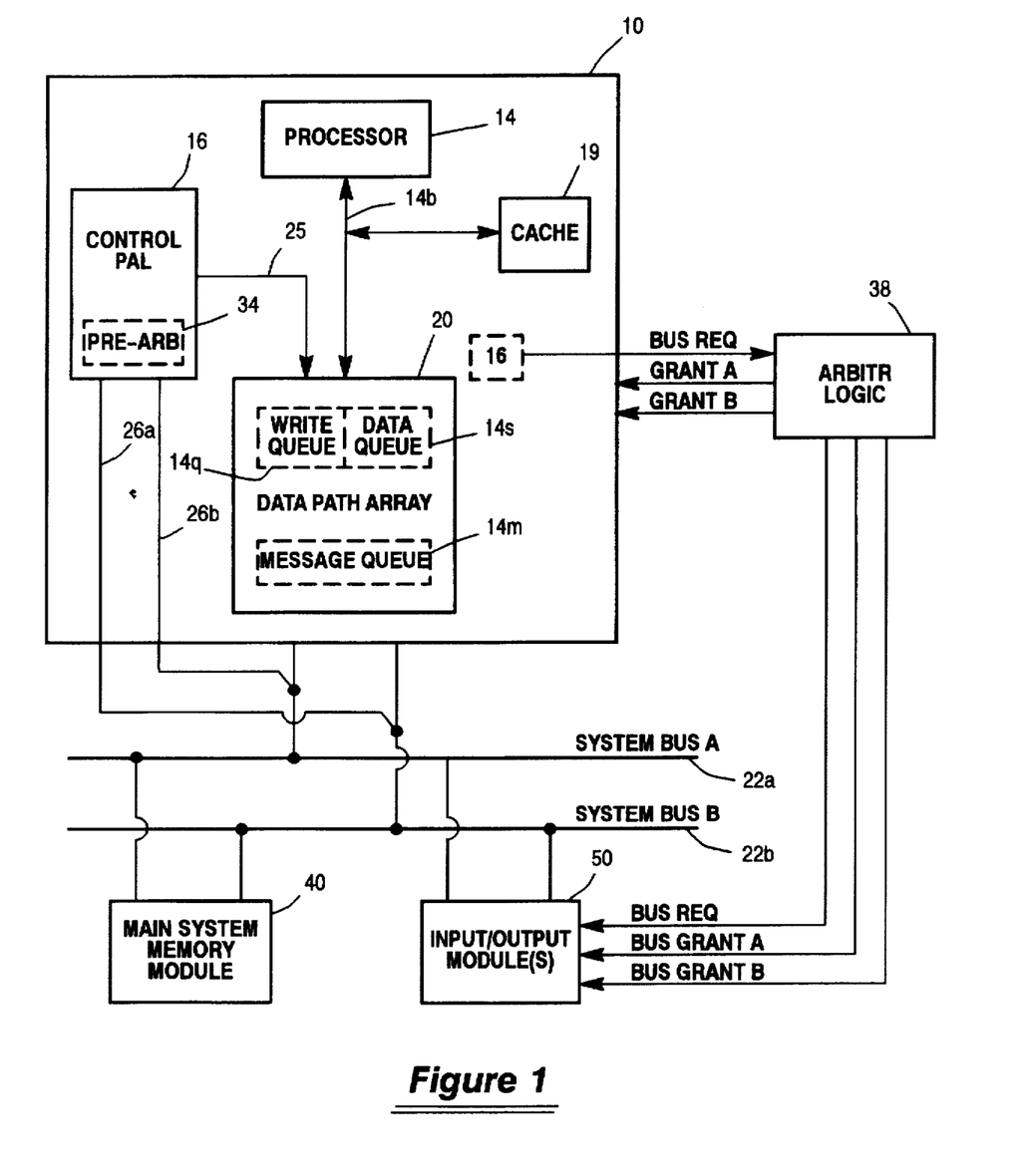
FIG. 1 is a diagram of a computer network with dual system busses and showing the specialized elements in the Central Processing Module.
Figure 2:
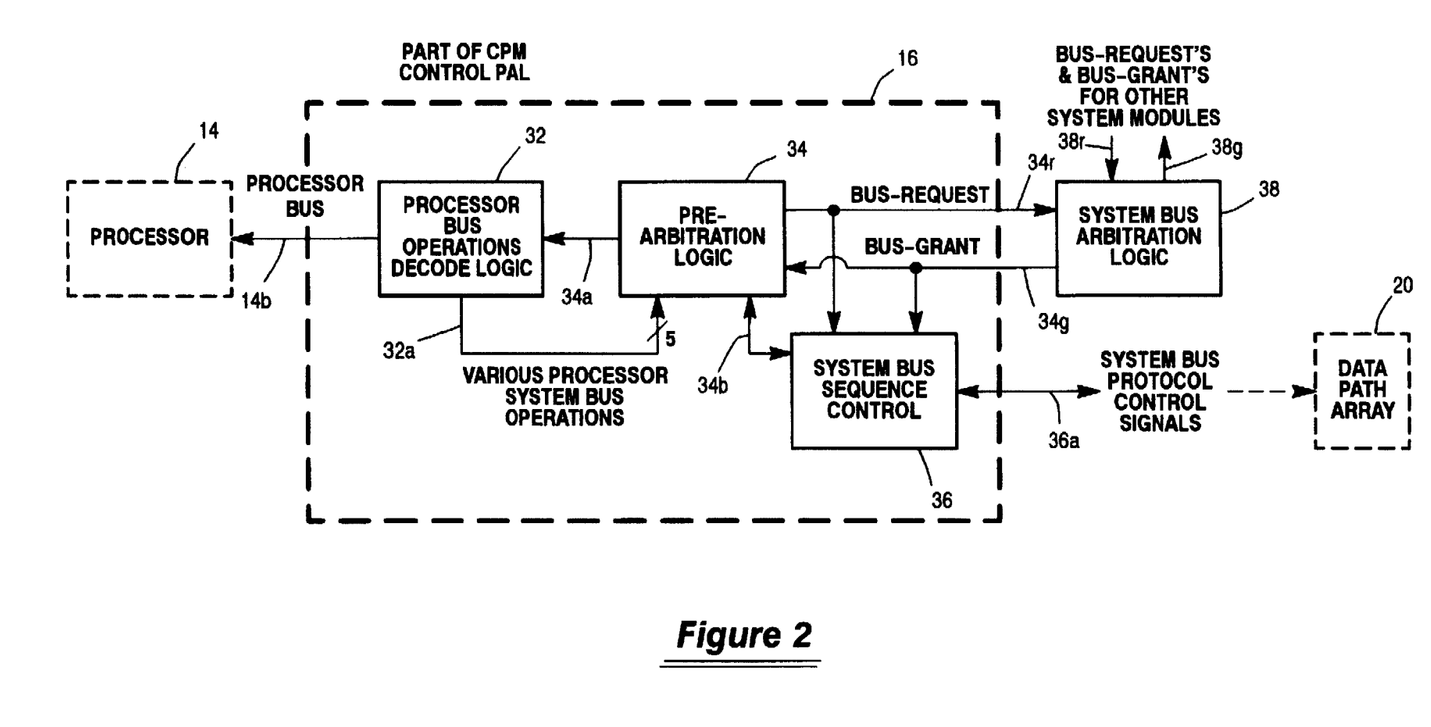
FIG. 2 is a more detailed diagram of the programmable array logic, Control PAL of FIG. 1.

The present system presents a preliminary arbitration method (Pre-Arbitration) that occurs in a processor module 10 (FIG. 1) in advance of its Bus-Request signal to the bus arbiter unit, such as unit 38 of FIG. 2. This is accomplished in a soft manner and implemented in a small section of a programmable array logic device 16 (Intel Flex) which is used to generate the Bus-Request signal itself. This feature allows the actual order of operations, as they have occurred out of the processor 14, to be "modified" according to their importance to the system performance. The more important operations are allowed "by look-around" to function ahead-in-time of other operations which are in line and may even be used to bypass them to the head of the line.

The processor 14 of FIG. 1 will execute operations in a given sequence. "External" operations, like memory Reads and Writes, come out of the processor 14 onto the processor bus 14b in the order of processor execution. If, for example, the processor does a Write OP, then another Write and then a Read, this presents the order of sequence (in-line sequence of operations) which will occur on the system bus 22a or 22b. The new look-around and bypass feature may allow the Read OP to go first (before the Write OP) to the head of the line. Thus, in this case, the Read OP is at the head of the line of operations and has "bypassed" the Write OPs which would have been executed earlier than the Read OP if not for the bypass or "look around" arrangement allowing modification of the sequential order of execution.

SUMMARY OF THE INVENTION

A digital computer network having a central processor is normally executing Read and Write command OPs in the normal order of sequence as the Commands are received. Since system bus availability to main memory is not always readily available, the central processing module requires a bus arbitration system to determine when a processor command will get bus access while the processor commands are often waiting for bus access in a Write Queue and Message Queue.

The present system provides a pre-arbitration and look-around circuit to determine when a Read OP address is not the same as a Write OP address which will then allow the Read OP to bypass the Write OPs in sequence for execution even though the Write OP commands occurred earlier in time sequence than the Read OP command.

The look-around and bypass features optimize the use of processor time by allowing the Read OP first priority of execution when the Read OP will not affect the data coherency of the system.

By use of a pre-arbitration logic unit and system bus sequence control unit, the priority of access to the system busses can be modified so that the longer cycles of Read OP to main memory will get priority over the queued Write OPs and Send Message OPs.

DESCRIPTION OF PREFERRED EMBODIMENT

Referring to FIG. 1, there is seen the Central Processing Module Block 10 (CPM) having a processor 14 connected to a data path array 20 through a processor bus 14b. The data path array 20 provides connections to the dual system busses 22a and 22b. The data path array 20 provides for the steering and registering of the data portion and address portions of system bus operations to and from the processor 14. A programmable array logic unit designated Control PAL 16 connects on line 25 to the data path array 20 and connects to the system busses via control lines 26a and 26b. The Control PAL 16 constitutes a soft programmable set of devices which provide the control for the Central Processing Module 10. The lines 25, 26a, 26b represent the system bus control signals which are required to fulfill the bus protocols involved.

The Control PAL 16 will provide the Bus-Request for the Central Processing Module 10 to the Bus Arbiter 38 when access to either system bus is required. It is in the Control PAL 16 that the "pre-arbitration" logic of this system is implemented, as shown in FIG. 2. Processor Initiated System Bus Operations FIG. 2 is an expanded drawing showing the elements of the Control PAL 16 as it relates to the system bus arbitration logic 38. In FIG. 2, the processor 14 communicates via processor bus 14b to the processor bus operations decode logic 32. The operations decode logic 32 communicates via bus 32a to the pre-arbitration logic unit 34 which is shaded to emphasize the focus of the present system. The pre-arbitration logic unit 34 signals a bus request command on line 34r to the system bus arbitration logic 38 which can then return a bus grant signal on line 34g, to the pre-arbitration logic 34. The pre-arbitration logic 34 will then use bus 34a to send back the bus grant signal to the processor via decode logic 32, and bus 14b to the processor 14. Another unit influenced by the pre-arbitration logic 34 is the system bus sequence control 36 which receives commands on bus 34b from the pre-arbitration logic 34. The system bus sequence control 36 will receive the bus request signal 34r and the bus grant signal 34g in order to provide on line 36a the system bus protocol control signals.

In FIG. 2, various processor initiated operations will appear on bus 32a which require system resources and which are used to initiate system operations. Before observing the pre-arbitration logic 34, it may be helpful to discuss the processor initiated system bus operations.

With the exception of "Receive and Send Message" operations, all other CPM-to-system bus operations are initiated by the processor 14. The processor 14 executes various commands over its on-card processor bus 14b. The programmable array logic, Control PAL 16 provides the necessary processor element protocols and decodes the processor commands, as indicated in the unit 32 of the Control PAL 16 of FIG. 2. The Control PAL 16 provides the required processor element protocols and also decodes the processor commands. The decoded controls for the various commands will then steer the data path array 20 of FIGS. 1,2 as needed. Further, the decode controls will start off the system operations by initiating the pre-arbitration process. The Table I shown below describes the various processor initiated system bus operations. Each of these command functions will require access to and usage of system bus A, B (22a, 22b), FIG. 1.

TABLE 1

Processor Initiated System Bus Operations

| COMMAND | DESCRIPTION |
|---|---|
| OVERWRITE | The WRITE command causes processor supplied data to be written into main system memory at the processor supplied address location.<br>NOTE: Up to 4 WRITES will be queued within the Data Path Array 20. These will be executed to the system busses when convenient. |
| READLOCK | The RDLK command causes processor supplied data to be written into the main system memory at the processor supplied address location. Additionally, the data previous in that memory location will be returned as data back to the processor. |
| READ | The processor supplies an address; the main system memory at this location is read and the data value is returned back to the processor. Two versions of READ are used: READ1 |

TABLE 1-continued

Processor Initiated System Bus Operations

| COMMAND | DESCRIPTION |
|---|---|
| | requests a single word of read data from memory. READ4 requests a 4-word block of read data from memory. |
| READ-TIME-OF-DAY | The RTOD command requests from one of the I/O Processors in the system, that the time-of-day value be returned to the processor as data. |
| SEND MESSAGE | The SNDMSG takes a four word message previously loaded into the Data Path Array message queue and sends it out over the system bus. |

The system bus sequence control 36 of FIG. 2 involves the unit that controls the protocol and controls the sequences for the system bus operations in the network. The system bus sequence control 36 is initiated by the processor commands decode logic block 32 and the reception of the appropriate Bus-Grant signal on line 34g from the system bus arbitration logic 38. Bus-Request Signal Further shown in FIG. 2 is the pre-arbitration logic unit 34 which produces a signal called Bus-Request on Line 34r. This signal actually leaves the CPM module 10 and goes to the system bus arbitration logic 38, along with request signals 38r from all other system modules. The Bus-Request signal is to remain active until the arbiter 38 has granted access to a system bus via the Bus-Grant signals on line 34g or line 38g (other modules). The system bus arbiter 38 uses a round-robin algorithm to assure that all system modules will get equal opportunities for access onto the system busses. Both system busses 22a and 22b will typically be active simultaneously, but no one single system module, for example, a processor, can own the access rights to both busses simultaneously.

Bus-Request Generation—Earlier Methods

Absent the pre-arbitration logic 34 of the present system, the processor decode logic 32 would create the Bus-Request signal directly on its own. The main processor 14 functions to execute one processor bus command on line 14b at a time. However, in the case of the "Write only" type of commands (from Table I above), then from the processor's point of view, these are executed very quickly and the processor moves onto the next operation. A "Write only" type of command would involve the Write command and the SNDMSG command (Table I). Neither of these commands will wait for any return of data back to the processor 14. Therefore, the processor can continue on with new work once the command has been executed out onto the processor bus 14b.

When a "Read" type of command is executed by the processor 14, then of course, return data is expected and the processor must wait for it. If the execution of the operation on the system busses is delayed, for example, say the busses are busy doing the work of other modules, and also since the system busses are much slower in operating clock frequency than is the processor 14, it is seen that the "Read" type operations can have a slowing or delaying effect on processor performance involving how much work the processor can get done in a given period of time.

Thus, with the earlier art methods operating without the "pre-arbitration" logic, then whenever any processor system bus type operation was pending, then the Central Processing Modules Bus Request Signal would be activated when the Bus-Grant signal from the system bus arbiter 38 was received by the processor 14. Then the first processor operation would be executed over the assigned system bus. This procedure would sequentially be repeated for each processor operation in their order of occurrence on the processor bus 14b. And this would be the only logical way to accomplish the tasks that the processor as doing.

Bus-Request Generation With New Pre-Arbitration Logic

With the utilization of the pre-arbitration logic 34 of this system, it will be seen that a more efficient sequential "execution order" of the processor commands can be accomplished. The criteria for the new order of operations using the system busses will consider the following factors:

(i) "Write" types (with no return data) free up the processor quickly.

(ii) "Read" types (with return data expected) make the processor sit and wait for data.

(iii) Read-Time-of-Day (RTOD) operations are very infrequent and can be made the lowest priority of all.

(iv) The SNDMSG (Send Message) commands are also less frequent than memory operations.

(v) Writes to main memory are about 20% of processor operations.

(vi) READs to main memory are nearly 80% of processor operations and should constitute the highest priority, if possible.

(vii) RDLK (Readlock) is a hybrid of items (v) and (vi), but they are not too frequent.

(viii) If cache memories are in the system, and they usually are, then data coherency is possibly affected if the "operation order" is changed from a standard sequence.

The pre-arbitration logic system functions to actually "modify" the sequential order of processor operations as they are executed onto the system busses. But at the same time, it will be seen that the pre-arbitration logic still takes into consideration the above-criteria (i) through (viii).

Memory Writes Are Buffered

Since memory Writes are buffered in Write Queue 14q, (FIG. 1) this aspect is not required to have the pre-arbitration logic 34, but without it, the ability to bypass certain operations will be seen as not very effective. Since "Write" type operations (WRITE and SNDMSG) get all the information needed immediately from the processor 14 over to processor bus 14b and can then subsequently be sent over the system busses at a later time, it makes sense to queue these write type operations up in some manner. Since WRITEs to memory are a large portion of processor operations, it is well to queue-up several of them. Additionally, they can be easily queued, since they only have an address value and a data value (two words). In the data path array 20, four WRITE operations are queued (in Write Queue 14q) in four sets of two registers, one of which is for the address value and one is for the data value. In an application specific integrated circuit device (ASIC), such a queue is easy to build. Thus, it is possible to easily "delay" up to four WRITEs to main memory if higher efficiency processor performance can be gained therefrom.

"Send" Messages Are Buffered

Figure 4A:
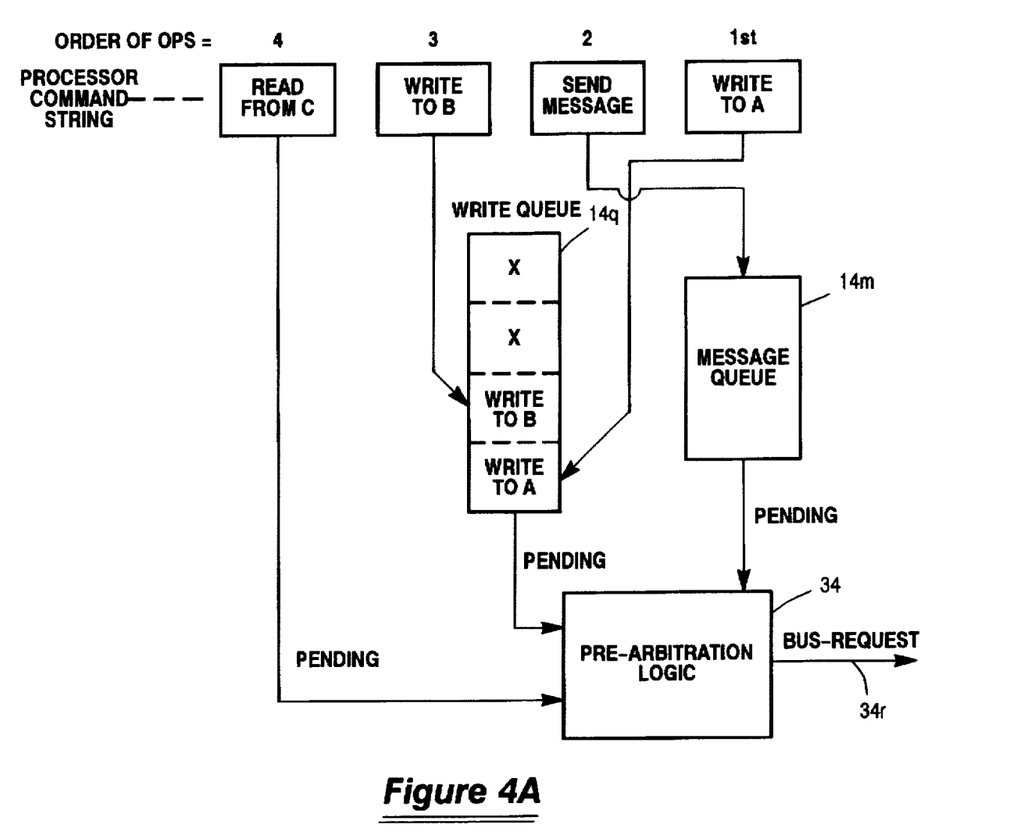
FIG. 4A is a drawing showing a sample stream or string of sequential processor operations in a particular order of occurrence from the processor.

Since send messages can be buffered in Message Queue 14m, FIGS. 1 and 4A, the same situation applies here as for the previous discussion regarding WRITEs to main memory. However here, since message traffic is much less frequent than main memory operations, the queuing of only one message to be sent is generally sufficient. In the Data Path Array 20, a queue 14m is provided for a "pending" send message. Here, the processor 14, using the processor bus 14b, builds up a "pending send message" as four words and then issues the send message command, SNDMSG. After issuing this command, the processor is free to continue with its next tasks. The pending message to be sent over the system busses can then "wait in the queue" (14m, FIG. 4a) until a convenient time for it to be executed.

Non-Critical Reads

Even though the Readlock (RDLK) command and the Read-Time-of-Day (RTOD) command are infrequent in occurrence, they can hold up the processor in waiting for return data. However, they are very much less important or less significant than are the memory type of operations which include both WRITEs and READs. The non-critical READs are given the lowest priority in the order of things since they are infrequent. If WRITEs are queued-up in the WRITE queue, 14q, FIGS. 1, 4A, then there is the possibility that if the queue gets full, the processor 14 will be held up because there is no place to put the next WRITE command that may occur. Thus, it is important then that WRITEs queued up in the data path array 20 be executed as soon as possible relative to those non-critical READ operations.

Memory Reads Constitute Job One

READs of main memory are important for two reasons. First, they are by far the most frequent processor operation. Secondly, the processor 14 cannot go on until the return data is received. The addition of a cache system 19 between the processor 14 and the data path array 20 on the processor bus 14b, provided by this system, greatly alleviates much of this delay. Perhaps up to 90%, on average, of all memory "READs" get cache hits and therefore never need to be executed to the system busses and never enter into the equation of importances. However, the 10% on average, that are "misses" are so significant to system performance, that the pre-arbitration logic unit 34 is well warranted for implementation. It is memory READs to the system busses 22a, 22b, that will take advantage of the "look-around" feature of this system and will then utilize the "bypass" feature to good advantage.

Bypass Feature

FIG. 4A shows a sample stream or a string of processor operations in a given order 1, 2, 3, 4 of occurrence from the processor 14. Thus shown, the first processor command is a WRITE to main memory location "A" followed by a Send Message command (SNDMSG), then another Write command, this time to main memory address "B", and then finally a READ command from the main memory location "C". In the example shown in FIG. 4A, the first WRITE is decoded and the address and data values for this WRITE command go into the first WRITE queue registers 14q. Next, the second command or Send Message (SNDMSG) is queued into the Pending Message Queue 14m in FIG. 4A.

If it is assumed that both system busses 22a and 22b are currently busy, which is a very likely situation, then the next processor command which is the third operation in FIG. 4A designated "WRITE to B", is decoded and its address and data are transferred into the next registers of the WRITE queue 14q. With the busses still busy, finally the READ command is decoded from the processor 14 as the fourth operation "READ from C".

In a certain sense, the scenario depicted here is a type of worst-case situation, because it is seen that three distinct and separate operations are simultaneously pending and all contending for access to the system busses 22a and 22b. Such a condition is reasonably occurring quite often and illustrates the power of the pre-arbitration system. With or without the newly provided pre-arbitration logic, these operations would be taken one at a time. However, without the pre-arbitration logic 34, these sequential operations would be taken in the sequential order in which they occurred, Write-Send-Message-Write-Read i.e., the sequence 1,2,3,4 in FIG. 4A.

Figure 4B:
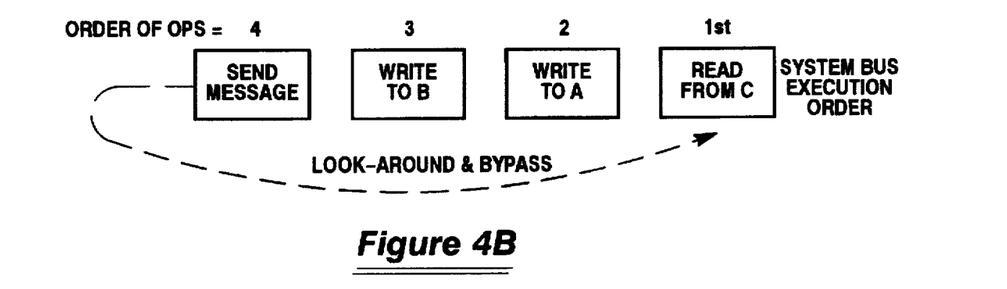
FIG. 4B is a drawing showing a modified order of system bus execution in executing various operators.

With the pre-arbitration system logic 34, a more efficient method of the execution order can be used based upon the earlier discussed criteria (i) through (viii). Then as seen in FIG. 4B, there is shown the "modified order" that the pre-arbitration method would most optimally execute in operations to the system busses. Here in FIG. 4B, there is seen the "modified order" of operation 1 through operation 4 which starts with the first operation which is Read From Location "C" in main memory, and the second operation which is the WRITE to main memory location A, then the third operation which is the WRITE operation to main memory location "B" and the fourth operation which is the Send Message operation. In FIG. 4B, it may be noted that two of the commands have bypassed the "original sequential order" which was shown in FIG. 4A. First, and most importantly, the READ from "C" has jumped (bypassed) to the head of the line into the first operating position. Of all the commands shown in this example, this is the only one that could be delaying and holding up the activity of the processor 14.

The second case of the "bypass" feature occurring in this example, is that of the WRITE to memory location "B" command which has also bypassed the Send Message command of FIG. 4A (SNDMSG). Again, this functions to work toward emptying the WRITEs queue 14q as quickly as convenient in order to prevent the processor from having to possibly wait on a WRITE command if the Write queue became full.

In this situation shown in FIGS. 4B and 4A, the two bypass feature applications will provide a significant processor performance improvement. For the present example, in FIG. 4A, if the processor were operating at a clock rate twice the frequency of that on the system busses, then while the processor "idles" waiting for the READ from address "C" for return data from main memory 40, three other complete system bus accesses and operations must first take place, which would include: a WRITE; a Send Message (SNDMSG); and then a second WRITE, shown in FIG. 4A (without the Pre-Arbitration feature).

For this situation alone, these operations, under best case times, will take 17 system bus clock periods. This becomes the equivalent of 34 "processor" clock periods. Then the READ will take place about seven more system bus clocks in order to return memory data using 14 processor clocks. From these best case times, it is seen that, without the pre-arbitration bypass feature, the processor would have waited about 48 "wasted" processor clock periods in order to get its required READ data. However, on the other hand, with the pre-arbitration logic bypass feature, the READ-data from Main Memory 40, is available to the processor in about 14 processor clocks. From these best-case times, it may be seen that without the pre-arbitration bypass feature, the processor would have waited about 48 wasted processor clock periods to get its required read data. However, by use of the pre-arbitration logic bypass feature, the necessary data is available to the processor in about 14 processor clocks.

Look-Around Feature

FIG. 4B demonstrates the vital feature of the pre-arbitration method. The look-around feature is seen when the READ from "C" operation "bypasses" the other operations and goes to the head of the line. This feature is required for all memory READ operations and fulfills the criteria for item (viii) under the discussion on Bus-Request generation pre-arbitration.

For a READ operation to jump ahead of any memory WRITE operations, (which is a major performance advantage in this system), but also to ensure proper data coherency in the Central Processing Module's cache memory, it is necessary that the "look-around" occur. The "look-around" feature is the action of comparing the addresses of any WRITEs that are active in the WRITE queue 14q (FIG. 4A) against the address for this particular READ command. In the case situation shown in FIG. 4A, the address value "A" and the address value "B" are compared to the address value "C". Then, if it is found that "C" is equal to "A" or to "B" then the READ command cannot bypass the WRITE command whose address is equal to the READ command. If for example, it is found that "C" is equal to "A" then in this example, the READ has looked-around and can "bypass" the WRITE to "B", but must wait behind the operation of WRITE to "A".

In summary, a "Read" from "C" cannot bypass any "Write" to the same exact address. Therefore, if "C"="B", then a "Write" to "B" cannot be bypassed. If "C"="A", then a Write to "A" cannot be bypassed. However, if "C" is not ="B" or "C" is not="A", then the "Read" from "C" can bypass the "Write" to "A" and "Write" to "B".

Thus, as long as the C (Read) address does not equal the A (Write) address or the B (Write) address, then the "Read" from C can go ahead and bypass the write operations.

If the look-around results in no equal comparisons to any address values in the WRITE queue 14q, then the READ is free to bypass all of these WRITE operations. The reason for the "look-around" operation is that the processor 14 wants the information that is stored in memory location "C" in order to do various tasks with it. However, if there are any WRITEs in the queue 14q ahead of the READ operation which are intended to "modify" the data in address location "C", then the READ operation must wait for the data to be updated by the WRITE operation before retrieving the data from memory or else it will get old, stale data. In summary, the look-around feature allows READs to inspect the queued WRITE addresses in the queue 14q, in order to assure that the "latest" data value will be read from main memory if the Read operation is allowed to bypass the WRITE operations.

Look-Around Feature-Implementation

Figure 5:
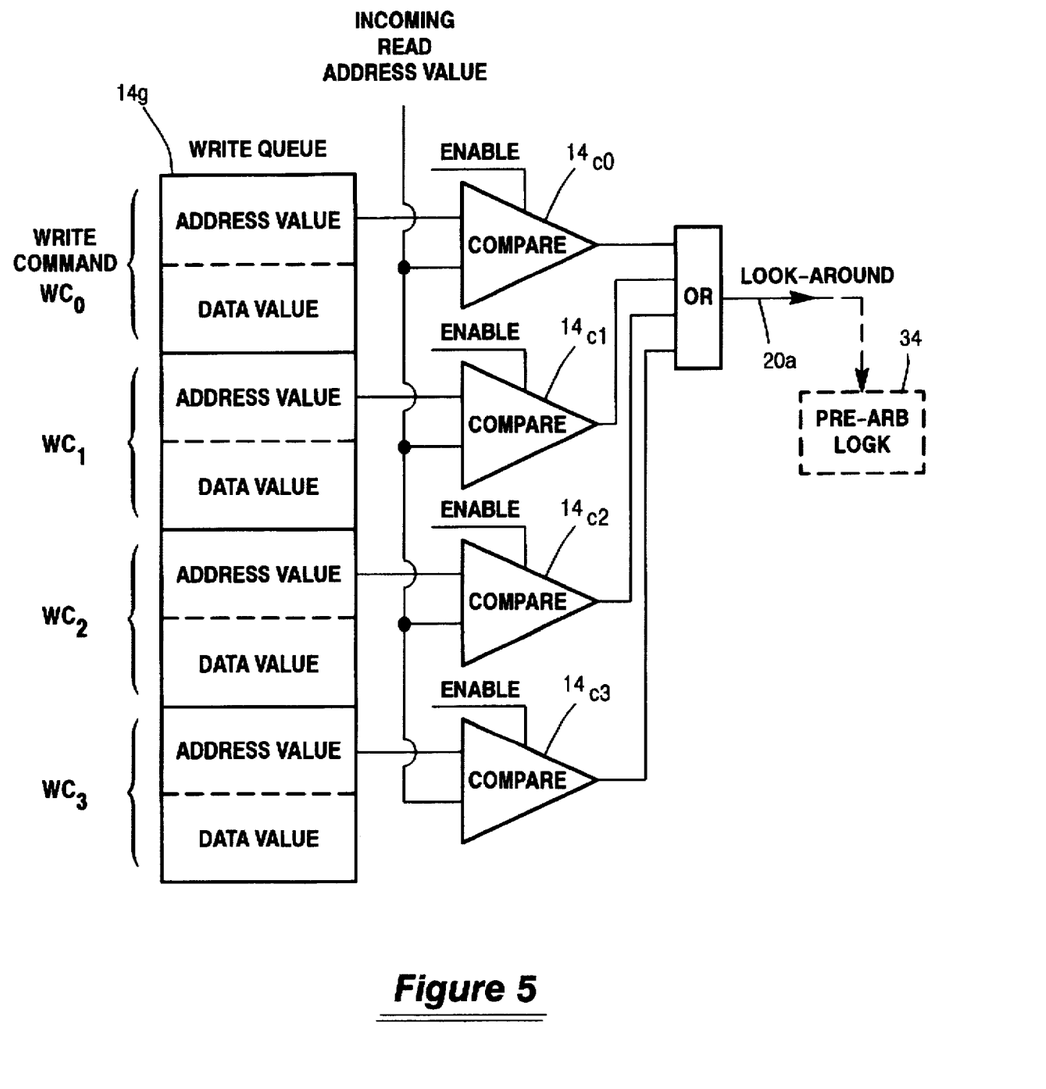
FIG. 5 is a drawing of the look-around logic which is implemented in the data path array.

FIG. 5 is a drawing showing how the look-around logic is implemented in the data path array 20. The WRITE queue 14q has registers to hold both the address value and the data value for up to four WRITE commands $WC_0$, $WC_1$, $WC_2$, $WC_3$. The address value from each one of the pairs in the WRITE queue 14q are fed to each of its own individual comparison circuits $14c_0$, $14c_1$, $14c_2$, $14c_3$, which compares the address value from each address in the WRITE queue 14q with the incoming processor bus address for the READ operation. Each compare circuit 14c has an enable control input. This is driven by whether the queue 14q has an active WRITE address value in it at that location currently. The compare outputs from 14c are logically OR'ed to form a signal called the "look-around" signal on line 20a of FIG. 5. The look-around line 20a is connected to the Pre-Arbitration Logic 34 (FIG. 2) to determine whether or not the Read-OP can bypass the Write-OPs. When active, this signal on line 20a denotes that a look-around compare has occurred and operates to indicate that the READ operation cannot do a bypass yet. The WRITE Queue 14q is a first-in, first-out (FIFO) type of queue, that is to say that the WRITEs are removed in the order that they were entered into the queue. When the particular Write, whose address value has caused a look-around address-match, has been removed from the queue 14q, then the look-around signal 20a will be deactivated and now the READ OP can now bypass the remaining WRITEs.

The logic shown in FIG. 5, if it were built in a discrete type of logic architecture could be somewhat costly. However, the data path array 20, which is an application specific integrated circuit (ASIC) is available to accommodate the logic necessary for the WRITE queue 14q and comparitors 14c shown in FIG. 5. Thus, in a sense it can be considered to be free from additional cost to the system.

Bypass Feature—Implementation

As was seen in FIGS. 4A and 4B, several pending operations were shown as inputs to the pre-arbitration block 34. Shown therein, was the Send Message signal (SNDMSG), a WRITE and a READ. However, not shown in the FIGS. 4A and 4B were the very low priority commands that might also contend for the system busses 22a and 22b and these would be the Read-Time-of-Day (RTOD) and the Readlock (RDLK) commands. Thus, it should be understood that five independent processor operations, such as those named above, are inputs to the pre-arbitration logic block 34 of FIG. 4A, and also FIG. 2.

From the five command inputs, the pre-arbitration logic block 34 must determine which operation is best executed first. Referring to FIG. 2, these five processor command decode signals are seen on bus lines 32a as inputs to the pre-arbitration logic block 34. When the pre-arbitration logic 34 has determined which operation to "first execute" over the system busses, it notifies the system bus sequence control logic 36 via line 34b. When the selected operation is successfully completed over a system bus, the processor decode logic 32 is notified via line 34a and the appropriate command decode signal is deactivated.

Seen below will be shown a group of tables which described the important items which are used to implement the bypass feature of the pre-arbitration logic block 34.

Table II describes the signals involved on bus 32a in FIG. 2. Table III involves the signals on bus 34a in FIG. 2. Table IV involves the bus 34b in FIG. 2. Table V involves the signals in the pre-arbitration logic unit 34 of FIG. 2.

TABLE II

Signals on bus 32a of FIG. 2

| SIGNAL NAME | DESCRIPTION (Bus 32a in FIG. 2) |
|---|---|
| RDMISSFF | Processor command decode signal indicating a READ command is pending for a read of main system memory. This operation will always be the highest priority operation if the Look-Around logic allows. |
| RTODFF | Processor command decode signal indicating that a Time-of-Day Read operation is pending. Should always take the lowest priority position. |
| RDLKFF | Processor command decode signal indicating that a READLOCK operation is pending for system bus execution. Takes a low priority position. Note—these are exclusive from READs. |
| SNDMSGFF | Processor command decode signal indicating that a message is in the message queue |

TABLE II-continued

Signals on bus 32a of FIG. 2

| SIGNAL NAME | DESCRIPTION (Bus 32a in FIG. 2) |
|---|---|
| | and pending for system bus access. Takes a low priority. |
| WB_EMPTY | Signal from the WRITE queue indicating that the queue is currently empty—contains no active WRITE commands. When this signal is low then the queue is not empty—contains active WRITE commands. Takes next to highest position below READs except when Look-Around logic puts it at the highest position. |

TABLE III

Signals on bus 34a of FIG. 2

| SIGNAL NAME | DESCRIPTION (Bus 34a in FIG. 2) |
|---|---|
| RDCMPLT | Signal from Pre-Arbitration block indicating the successful completion of an active READ operation over a system bus. This will cause the appropriate data transfers back to the processor over the processor bus 14b and will deactivate the RDMISSFF. |
| WB_UNLOAD | Signal from Pre-Arbitration block indicating the successful completion of an active WRITE and to get the next WRITE in the queue if available. |
| SMCMPLT | Signal from Pre-Arbitration block indicating the successful completion of an active SNDMSG operation over a system bus. This will cause the SNDMSGFF signal to be deactivated. |
| RLCMPLT | Signal from Pre-Arbitration block indicating the successful completion of an active RDLK operation over a system bus. This will cause the appropriate data transfer back to the processor over the processor bus and the RDLKFF signal to be deactivated. |
| RTCMPLT | Signal from Pre-Arbitration block indicating the successful completion of an active RTOD operation over a system bus. This will cause the appropriate data transfer back to the processor over the processor bus and the RTODFF signal to be deactivated. |

TABLE IV

Signals on Bus 34b of FIG. 2

| SIGNAL NAME | DESCRIPTION (BUS 34b in FIG. 2) |
|---|---|
| BIU_CMD(2:0) | Signals from Pre-Arbitration block indicating the in encoded form what is the current system bus operation active. This is used by the system protocol Control PAL for proper protocol sequencing. |
| SCMPLT | Signal from the system bus sequence control block 36 back to the Pre-Arbitration block indicating at the current system bus operation has completed successfully. |

TABLE V

Signals for (Pre-Arbitration Logic Unit 34, FIG. 2

| SIGNAL NAME | DESCRIPTION (Pre-Arbitration Logic Unit, FIG. 2) |
|---|---|
| WB_OUT | Internal signal to Pre-Arbitration block indicating that the current selected operation is a WRITE. |
| WBOUTFF | Internal flip-flop in Pre-Arbitration block used as a hold flip-flop for the WB-OUT signal above. |
| NWB_OUTB | Internal flip-flop in Pre-Arbitration block indicating that the current selected operation is NOT a WRITE but rather a READ, SNDMSG, RTOD, or RDLK. |
| SMOUTFF | Internal flip-flop in Pre-Arbitration block indicating that a SNDMSG operation is currently active on a system bus. |
| BRFF | Internal flip-flop in Pre-Arbitration block indicating that the system has been accessed for the current operation. This is used to prevent re-activation of the BUS-REQUEST signal for the same operation multiple times. |
| BUS-REQUEST | Flip-flop built in Pre-Arbitration which is the request for this module to the system arbiter. This flop-flop is on when access to a bus is needed; once a system bus has been granted, BUS-REQUEST must be dropped. |
| A_BGNT, B_BGNT | Inputs 34g to the Pre-Arbitration block from the system bus arbiter indicating that either the A or the B system has been granted. |
| A_BBSYOUTF | Flip-flops generated in the system bus control block (36) when either the A or the B bus has been granted indicate that the respective system bus is now busy—and is presently owned. |

Table VI gives the logic equations that implement the bypass feature in the Control PAL (16).

TABLE VI

| SIGNAL NAME | LOGIC EQUATION | |
|---|---|---|
| WB_OUT = | WB_EMPTY/ * LOOK-AROUND | (1) |
| | + WB_EMPTY/ * RDMISSFF/ | (2) |
| | (1) makes WRITEs the highest priority if the Look-Around finds a compare. | |
| | (2) makes READs the highest priority over WRITEs. | |
| WBOUTFF:= | WBOUTFF/*WB_OUT*SMOUTFF*BRFF | (3) |
| | + WBOUTFF * WB_UNLOAD/ | (4) |
| | (3) sets flip-flop on WB-OUT when a bus operation has begun. | |
| | (4) holds the flip-flop until the unload of the write queue. | |
| WB_UNLOAD:= | WB_UNLOAD/ * WB_OUT * SCMPLT | (5) |
| | (5) sets the queue unload flip-flop when a WRITE operation completes. | |
| NWB_OUT:= | RDMISSFF+RDLKFF+RTODFF+ SNDMSGFF | (6) |
| | (6) sets flip-flop for any non-WRITE operation | |
| SMOUTFF:= | SMOUTFF/ *SNDMSGFF*WB_OUT/ *RDMISSFF/ * RDLKFF/ * RTODFF/ * BRFF | (7) |
| | + SMOUTFF * SCMPLT | (8) |
| | (7) sets flip-flop when SNDMSG is allowed onto a system bus. | |
| | (8) holds flip-flop until the SNDMSG is completed on the bus. | |
| BRFF:= | BRFF/ * (A_BBSYOUTF + BBSYOUTF) | (9) |
| | + BRFF * WBOUTFF | (10) |
| | + BRFF * WBOUTFF/ * NWB_OUT | (11) |
| | (9) sets flip-flop when either of the system busses are granted. | |
| | (10) holds the flip-flop while WRITEs are active. | |
| | (11) holds the flip-flop while non-WRITEs are active. | |
| BUS-REQUEST:= | BUS-REQUEST/*BRFF/*WB_OUT*AB | (12) |

TABLE VI-continued

| SIGNAL NAME | LOGIC EQUATION | |
|---|---|---|
| | +BUS-REQUEST/*BRFF/*WB_OUT/ *NWB_OUT*AB | (13) |
| | +BUS-REQUEST*AB | (14) |
| | (12) sets flip-flop for WRITEs if no bus is currently owned. | |
| | (13) sets flip-flop for non-WRITEs if no bus is currently owned. | |
| | (14) holds flip-flop on until a bus is granted (owned). | |
| RDCMPLT= | RDMISSFF*WB_OUT/ *SMOUTFF/*SCMPLT | (15) |
| | (15) issues READ completed if active on bus and completes ok. | |
| SMCMPLT= | SNDMSGFF*SMOUTFF*SCMPLT | (16) |
| | (16) issues SNDMSG complete if active on bus and completes ok. | |
| RLCMPLT= | RDLKFF*WB_OUT/*SMOUTFF/ *SCMPLT | (17) |
| | (17) issues RDLK complete if active on bus and completes ok. | |
| RTCMPLT= | RTODFF*WB_OUT/*SMOUTFF/ *SCMPLT | (18) |
| | (18) ISSUES RTOD complete is active on bus and completes ok. | |
| BIU_CMD(2:0)= (encoded) | =111 if RDLKFF * WB_OUTFF/ * SMOUTFF/ =110 if WB_OUT *SMOUTFF/ =101 if SNDMSGFF*WB_OUT/*RDLKFF/ *RTODFF/*RDMISSFF/ =011 if RDMISSFF*LOOK-AROUND/ =001 IF RTODFF*WB_OUT/*SMOUTFF/ | |

'AB' is a define term = (A_BGNT/*A_BBSYOUTF/*B_BBSYOUTF/)
Note:
= is logical for gate equations
:= is the set terms for D-type flip-flop equations
* logical-and
+ logical-or
/ logical-not The logic implementation shown in Table VI implements the bypass feature and the look-around features of the pre-arbitration logic 34 according to the following priorities:

(1) READs will always be #1 in priority unless the Look-Around disallows this operation.

(2) WRITEs will always be #2 in priority unless the Look-Around puts them higher than READs.

(3) Read-Locks (RDLKS) and the Read-Time-of-Day (RTODS) will be #3 in priority.

(4) The Send Message operation (SNDMSGs) will be last in priority. These commands can wait until all READ types and WRITEs are executed.

The above-described system and method provides the ability for a digital operations network in setting priorities and re-arranging priorities for system bus execution so they can be re-ordered and modified in the manner that is advantageous to system performance and yet without sacrificing data integrity. The system is implemented partially within a gate array in a system which always required a gate array without the pre-arbitration logic. Thus with the addition of the pre-arbitration logic, then this added sectional circuitry can be considered as free, since all the information required is already present in this system. The remainder of this system is implemented as a small portion of a programmable array logic device manufactured by the Intel Corporation and called the Intel Flex, part no. iFx780. Here again, the special features of Look-Around and Bypass provide significant potential assistance to improving processor performance.

While one particular implementation of the above-described system has been illustrated, it should be understood that other versions may be implemented while still using the concept of the described system which is defined in the following claims.

What is claimed is:

1. A method for modifying the priority of bus access from an ordinary sequential grant of bus access, involving the sequential order of bus requests received by an arbitration means, to a modified sequence of bus access which grants priority of bus access according to predetermined parameters, comprising the steps of:

(a) accumulating Write commands, Read commands, Non-Read commands, Non-Write commands and Send Message commands in waiting-queues to be granted bus access according to the time sequence the command was received in the waiting queue;

(b) granting bus access to commands in said waiting-queues on a sequential first-in-first-out basis;

(c) modifying said sequential first-in-first-out basis of bus access in order to grant earlier access to Read commands which will not degrade cache coherency;

(d) comparing the Read-address value of a later-received Read command with the Write-address value of an earlier-received Write command to insure that these addresses do not match (no-match);

(e) advancing the later-received Read command ahead of the earlier-received Write command, for bus access when the no-match condition occurs;

(f) deferring bus access to Non-Write and Non-Read commands until after bus access has been granted to Read and Write commands which were in the said waiting-queues at the time that the Non-Read and Non-Write commands were initiated.

2. A bus access arbitration system in a computer network for modifying the priority sequence of bus access according to the types of Read/Write or Non-Read/Write commands residing in FIFO register queues, said system comprising:

(a) bus means for carrying Write Commands, Read Commands, and Non-Read/Non-Write commands from a first digital module to a second digital module;

(b) bus arbitration means for receiving bus request for access from said first digital module;

(c) Queue means for holding incompleted Write, Read, and Non-Read/Non-Write Commands which are normally given bus access on a first-in-first-out sequential order;

(d) Pre-arbitration means for modifying the said first-in-first-out sequential order to alter the sequence of bus access, said means including:

(d1) look-around means to compare the Read-address of a later-received Read command with the Write-address of any earlier-received Write commands;

(d2) system bus sequential control means to modify the first-in-first-out sequence of commands so that said later-received Read command is placed ahead in sequence for bus access of said earlier received Write commands, when said look-around means signals a "no-match" in said Read-address value and said Write address value, said sequential control means deferring bus access for said Non-Read/Non-Write commands until after the execution of said Read/Write commands residing in said queue means.

3. In a computer network wherein a central processing module having a processor, a control PAL and data path array having queue means for holding pending incomplete processor commands, said data path array interfacing to dual system busses which connect to an external main memory and an input/output module, a system for modifying the priority of access to said dual system busses for processor commands from a sequential time sequence to a modified order of priority in order to increase throughput, said system comprising:

- (a) means to normally execute Read OPs, Write OPs, Time of Day OPs, Send Message OPs and Read-Lock OPs in the order of the time sequence that each OP occurred by granting bus access for each OP at the time of occurrence of said OP;
- (b) means to modify the priority of bus access so that a Read OP occurring after a Write OP will be given bus access priority as long as the Read OP has a different address from said Write OP, said means to modify including:
  - (b1) means to defer bus access for Send Message OPs, Read-Time of Day OPs, and Read-Lock OPs until said Read OPs and Write OPs have been executed and are no longer pending.

4. The system of claim 3 wherein said means to modify priority includes:

- (i) control PAL means connected to a system bus arbitration logic means which grants bus access, and including:
  - (ia) pre-arbitration logic means connected to said processor and to a system bus sequence control means for determining a modified order of bus access other than a straight time sequence of bus access according to the time of origin of a processor command, said modified order of bus access setting a priority of access for pending Reads before pending Writes but deferring bus access for non-Write and non-Read commands;
- (ii) said system bus arbitration means for receiving bus access requests and for granting bus access under control of said system bus sequence control means;
- (iii) queue means for holding pending non-executed Read, Write, Read-Lock, Time of Day, and Send-Message OPs until selected by said pre-arbitration logic for access to a system bus.

* * * * *